United States Patent [19]
Kawashima et al.

[11] Patent Number: 5,495,455
[45] Date of Patent: Feb. 27, 1996

[54] MAGNETO-OPTICAL DISK RECORDING AND READING APPARATUS AND METHOD WHEREIN THE RECORDING HEAD IS CONTROLLED IN THE RADIAL DIRECTION OF THE DISK TO A DESIRED POSITION

[75] Inventors: Tetsuji Kawashima, Chiba; Tetsu Watanabe, Tokyo, both of Japan

[73] Assignee: Sony Corporation, Tokyo, Japan

[21] Appl. No.: 50,657

[22] Filed: Apr. 22, 1993

[30]   Foreign Application Priority Data

Apr. 28, 1992   [JP]   Japan ..................... 4-136154

[51] Int. Cl.$^6$ ................. G11B 11/00; G11B 17/22
[52] U.S. Cl. ................. 369/13; 369/32; 369/215
[58] Field of Search ................. 369/13, 32, 112, 369/44.23, 215, 219, 220, 226, 228, 44.15, 44.17, 41, 33; 360/59, 114, 78.04, 77.04; 365/122

[56]   References Cited

U.S. PATENT DOCUMENTS

| | | | |
|---|---|---|---|
| 4,736,353 | 4/1988 | Kasai et al. | 369/32 |
| 4,937,801 | 6/1990 | Miura et al. | 369/13 |
| 5,070,494 | 12/1991 | Emoto et al. | 369/112 |
| 5,191,562 | 3/1993 | Hensing et al. | 369/13 |

FOREIGN PATENT DOCUMENTS

| | | |
|---|---|---|
| 0346063-A3 | 12/1989 | European Pat. Off. . |
| 0420696A2 | 3/1991 | European Pat. Off. . |
| 0422923A2 | 4/1991 | European Pat. Off. . |
| 0464947A1 | 8/1992 | European Pat. Off. . |
| 3607637A1 | 11/1986 | Germany . |
| 60125966 | 9/1983 | Japan . |

*Primary Examiner*—Ali Neyzari
*Attorney, Agent, or Firm*—Hill, Steadman & Simpson

[57]   ABSTRACT

A magneto-optical disc recording apparatus includes a magnetic head, an optical head, a position detector and a controller. The magnetic head supplies a vertical magnetic field corresponding to recording data to a magneto-optical disc. The optical head emits a light beam to the magneto-optical disc through a substrate of the magneto-optical disc. The magneto-optical disc is arranged between the magnetic head and the optical head. The optical head has an actuator for moving an objective lens in a tracking direction. The position detector detects the displacement of the actuator. The controller controls a recording operation of the magnetic head and the optical head. The recording operation is started when a result of detection by the position detector reaches a predetermined value.

2 Claims, 7 Drawing Sheets

(PRIOR ART)

MAGNETO-OPTICAL DISK RECORDING AND READING APPARATUS AND METHOD WHEREIN THE RECORDING HEAD IS CONTROLLED IN THE RADIAL DIRECTION OF THE DISK TO A DESIRED POSITION

BACKGROUND OF THE INVENTION

1. Field of the Invention

This invention relates to an optical disc recording method for recording an optical disc, and more particularly to an optical disc recording method wherein information is recorded onto an optical disc such as a magneto-optical disc when a movable portion of an optical head is positioned within a predetermined range.

2. Description of the Related Art

Information is recorded onto a recordable optical disc such as, for example, a magneto-optical disc, usually at the track pitch of about 1.6 µm in its tracking direction in order to adjust a spot of a laser beam at a high speed to a track. Accordingly, an optical disc recording apparatus usually includes two actuators for rough adjustment and fine adjustment in order to cause a light beam from an optical head to trace any of tracks on which data are recorded at the track pitch of about 1.6 µm. The actuator for fine adjustment is provided to cause a light beam to trace a track. The actuator for fine adjustment is provided usually on a movable portion of an optical head, but is sometimes provided separately from such movable portion. Meanwhile, the actuator for rough adjustment is provided to feed the optical head in a radiation direction of the disc.

A recording apparatus which employs a magneto-optical disc requires, in addition to an optical head, a magnetic head which generates a vertical magnetic field. In order to record information by a magnetic field modulating system, the magnetic head must generate a vertical magnetic field based on information to be recorded at an intensity sufficient to allow recording within the range in which the actuator for fine adjustment can possibly move. Accordingly, the magnetic head has a profile such that the length of a magnetic pole thereof in a radial direction of a magneto-optical disc is greater than that in a tangential direction of the magneto-optical disc.

Subsequently, an outline of a magneto-optical disc recording apparatus which uses a magneto-optical disc and the profile of a center magnetic pole of a magnetic head will be described.

FIG. 1 is a perspective view showing an exemplary one of a conventional magneto-optical disc recording apparatus. Referring to FIG. 1, the magneto-optical disc recording apparatus shown includes a laser diode 1 serving as a light source, a collimator lens 2 for converting a light beam emitted from the laser diode 1 into parallel light, and a beam splitter 3 of a trapezoidal shape. The beam splitter 3 has a first face 3a on which a dielectric multilayer film for separating a light beam emitted from the laser diode 1 and a return beam from the magneto-optical disc 6 from each other is provided, and a second face 3b on which a reflecting film for reflecting a return beam separated by and reflected from the first face 3a is provided. The magneto-optical disc recording apparatus further includes an objective lens driving apparatus 4 including two actuators for moving an objective lens 5 in a focusing direction and a tracking direction. The objective lens driving apparatus 4 includes a mirror for deflecting a light beam emitted from the laser diode 1 by 90 degrees toward the objective lens 5. The objective lens 5 is a single lens of the aspheric surface type. A magneto-optical disc 6 includes a substrate having a light transmitting property, a magneto-optical recording film provided on the substrate, and a protective film for protecting the magneto-optical disc film. The substrate of the magneto-optical disc 6 has pre-grooves formed at the track pitch of 1.6 ∥m in advance thereon for guiding a light beam. Recording of information onto the magneto-optical disc 6 is performed along the pre-grooves. The magneto-optical disc 6 is rotated at a fixed angular velocity by a spindle motor 9. A Wollaston prism 7 separates a return beam from the magneto-optical disc 6 into at least two light beams. A photodetector 8 has a plurality of light receiving portions for receiving a plurality of light beams separated by the Wollaston prism 7. An optical head 12 includes the laser diode 1, collimator lens 2, beam splitter 3, objective lens driving apparatus 4, objective lens 5, Wollaston prism 7 and photodetector 8 as described above.

The magneto-optical disc recording apparatus further includes a magnetic head 11 disposed in an opposing relationship to the objective lens driving apparatus 4 with the magneto-optical disc 6 positioned therebetween. The magnetic head 11 is connected to the objective lens driving apparatus 4 of the optical head 12 by way of a channel-shaped communicating portion 12a. The magnetic head 11 applies a vertical magnetic field, which is modulated in accordance with information to be recorded onto the magneto-optical disc 6 from the side of the magneto-optical recording film of the magneto-optical disc 6. An electromagnetic actuator of the objective lens driving apparatus 4 serves as an actuator for fine adjustment while a linear motor 10 serves as an actuator for rough adjustment.

The optical head 12 is moved in a radial direction of the magneto-optical disc 6 along the optical axis of a light beam emitted from the laser diode 1.

In FIG. 1, a light beam emitted from the laser diode 1 is converted into parallel light by the collimator lens 2. The parallel light advances toward the objective lens driving apparatus 4 by way of the first face 3a of the beam splitter 3. The light beam coming to the objective lens driving apparatus 4 is deflected by the mirror of the objective lens driving apparatus 4 and focused upon the recording film of the magneto-optical disc 6 by the objective lens 5. Meanwhile, a vertical magnetic field based on information to be recorded is applied from the magnetic head 11 to the magneto-optical disc 6. The recording film of the magneto-optical disc 6 is heated to a temperature higher than its Curie temperature by the light beam focused by the objective lens 5. As a result, the directivity of magnetization of the recording film of the magneto-optical disc 6 is erased, and, when the temperature of the recording film drops, the direction of magnetization of the recording film is determined by the vertical magnetic field which is applied thereto from the magnetic head 11 so as to record the information onto the magneto-optical disc 6.

The light beam is then reflected by the recording film of the magneto-optical disc 6 and advances to the beam splitter 3 by way of the objective lens 5 and the mirror of the objective lens driving apparatus 4. The light beam is thus reflected by the first face 3a of the beam splitter 3 and then reflected by the second face 3b of the beam splitter 3 so that it is introduced into the Wollaston prism 7. The light beam is then separated into at least two light beams by the Wollaston prism 7 and is then received by the photo-detector 8. A focusing error signal, a tracking error signal and other signals are thus formed based on an output signal of the photo-detector 8. The focusing error signal and the tracking error signal thus generated are supplied to the electromagnetic actuators of the objective lens driving apparatus 4 by way of servo circuits so that focusing and tracking are performed by the electromagnetic actuators of the object driving apparatus 4.

Meanwhile, a low frequency component of the tracking error signal thus generated is supplied to the linear motor 10 so that the optical head 12 is fed in a radial direction of the magneto-optical disc 6 in synchronism with recording onto the magneto-optical disc 6. Thus, the optical head 12 and the magnetic head 11 can be driven to the position of a desired track of the magneto-optical disc 6 by the linear motor 10 so as to record information on a desired location of the magneto-optical disc 6.

When information is recorded onto the magneto-optical disc 6, the spot of the light beam focused by the objective lens 5 on the magneto-optical disc 6 moves in a radial direction of the magneto-optical disc 6 within a certain range in a condition wherein the linear motor 10 remains stationary. Therefore, the magnetic head 11 must generate a magnetic field necessary for recording information within the range of movement of the spot on the magneto-optical disc 6.

The magnetic head 11 is constructed in the following manner.

FIGS. 2A and 2B are a plan view and a side elevational view, respectively, of a core of the magnetic head 11, and FIG. 2C is a side elevational view of the core of the magnetic head 11 on which a coil 26 is provided.

Referring to FIGS. 2A, 2B and 2C, the magnetic head 11 includes a base 21, and a disc-shaped core 23 provided on the base 21. The core 23 has a protrusion 22 formed at a central portion thereof, and has a pair of recesses 24 for leading out the opposite ends of the coil 26. A pair of U-shaped grooves 25 are formed on the opposite side faces of the core 23, and the coil 26 is secured to the base 21 by a protector 27 which is formed from, for example, Teflon. The coil 26 is wound around the protrusion 22 of the core 23. It is to be noted that reference numeral 28 denotes a track on the magneto-optical disc 6.

Magnetic fluxes are emitted radially from an end portion of the protrusion 22 of the core 23 of the magnetic head 11. As a result, the intensity of the magnetic field of the magnetic head 11 is substantially flat within the range of a central magnetic pole 29 corresponding to the protrusion 22 of the magnetic head 11 as shown in FIG. 3. In order to cover the range of movement of a beam spot on the magneto-optical disc 6, the length of the central magnetic pole 29 in a radial direction of the magneto-optical disc 6 must be made greater than the range of movement of the spot. In contrast, the length of the central magnetic pole 29 in a tangential direction of the magneto-optical disc 6 is sufficient if it covers the mounting error between the objective lens 5 and the magnetic head 11, for example, only ±50 µm.

The central magnetic pole 29 of the magnetic head 11 in FIG. 3, or in other words, the protrusion 22 of the core 23, has a profile which is elongated in a radial direction of the magneto-optical disc 6 as seen from FIGS. 2A and 2B. Referring to FIGS. 2A and 2B, the protrusion 22 is 600 µm in dimension in a radial direction of the magneto-optical disc 6 and 200 µm in dimension in a tangential direction. The central magnetic pole 29 can cover the range of movement of the spot of ±300 µm with respect to a track.

With the magneto-optical disc recording apparatus described above, however, the central magnetic pole 29, that is, the protrusion 22 of the core 23 of the magnetic head 11, increases in size as the range of movement of a beam spot increases. Consequently, also the diameter of the coil 26 increases, and the length of the wire material of the coil 26 increases. As a result, the inductance and the dc resistance of the magnetic head 11 increase and the power consumption of the magnetic head 11 increases, and also the amount of heat generated by the magnetic head 11 increases.

Generally, the magneto-optical disc 6 is accommodated in and used together with a disc cartridge. Thus, the magneto-optical disc recording apparatus includes a loading mechanism for a disc cartridge, and a mechanism for moving up or down the magnetic head in a timed relationship with a loading operation for a disc cartridge. As a result, a space necessary for a disc cartridge, the loading mechanism and a loading operation of the loading mechanism must be provided between the magneto-optical disc and the magnetic head. Consequently, a large gap is required between the magnetic head and the magnetic disc. If, under these conditions, an attempt is made to apply a magnetic field which is necessary for recording information onto the magneto-optical disc from the magnetic head, it is necessary to supply a high current to the magnetic head. Accordingly, there is a problem in that the power consumption and the amount of heat generated by the magnetic head are high.

SUMMARY OF THE INVENTION

It is, therefore, an object of the present invention to provide a magneto-optical recording method which resolves the above-described problem.

It is another object of the present invention to provide a magneto-optical disc recording apparatus which has reduced power consumption and heat generation in a magnetic head.

According to a first embodiment of the present invention, there is provided a magneto-optical disc recording apparatus comprising a magnetic head, an optical head, a position detector and a controller. The magnetic head supplies a vertical magnetic field corresponding to recording data to a magneto-optical disc. The optical head emits a light beam to the magneto-optical disc through a substrate of the magneto-optical disc. The magneto-optical disc is arranged between the magnetic head and the optical head. The optical head includes an actuator for moving an objective lens in a tracking direction. The position detector detectors the displacement of the actuator. The controller controls a recording operation by the magnetic head and the optical head. The recording operation is started when the results of detection by the position detector becomes a predetermined value.

According to a second embodiment of the present invention, there is provided a method of recording a magneto-optical disc using an optical head for receiving recording data and radiating a light beam corresponding to the received recording data to the magneto-optical disc and a magnetic head for supplying a vertical magnetic field to the magneto-optical disc, comprising the steps of determining whether or not the detected signal by position detecting means, which detects the position of a movable portion of said optical head in a radial direction of the magneto-optical disc, is within a predetermined range. When the results detected from said position detecting means is not within the predetermined range, the recording operation of said optical head and said magnetic heads onto the magneto-optical disc, does not occur. When the detected signal from said position detecting means is within the predetermined range, a recording operation occurs by said optical head and said magnetic heads onto the magneto-optical disc.

In the magneto-optical disc recording apparatus and method, only when the movable portion of the optical head or the actuator is at or in the proximity of its neutral position, does recording of data onto a recordable optical disc such as a magneto-optical disc occur. In this instance, since the magnetic pole of the magnetic head can be formed in a small circular shape, the wire material of the coil is reduced in length. As a result, the inductance, dc resistance and conductor capacitance of the magnetic head are reduced, and consequently, the power consumption is reduced and also the amount of heat generation by the magnetic head is reduced.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 4:
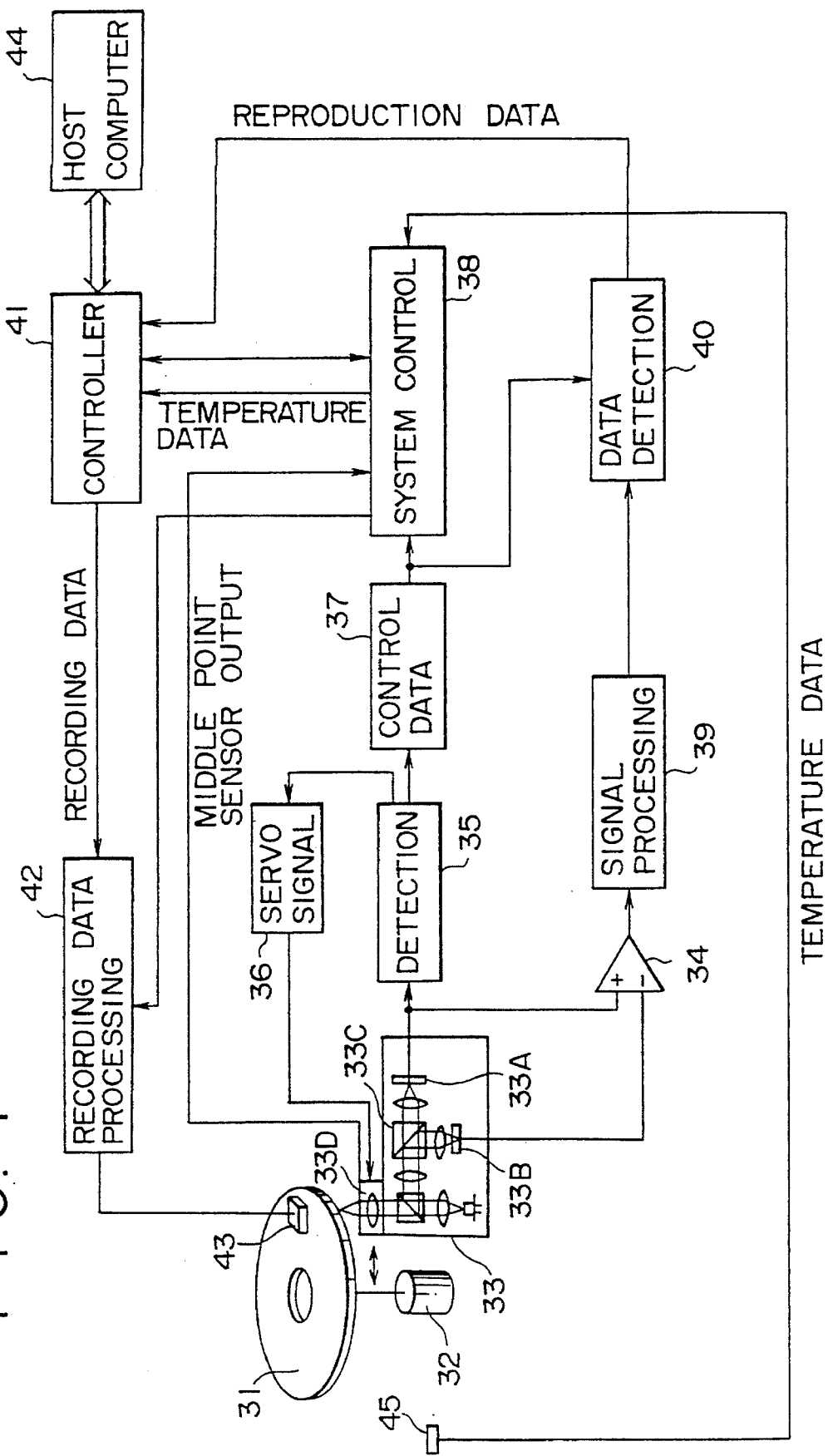
FIG. 4 is a block diagram of a magneto-optical disc drive apparatus showing a preferred embodiment of the present invention.

Referring first to FIG. 4, there is shown a construction of a magneto-optical disc recording and/or reproducing apparatus to which the present invention is applied. The magneto-optical disc recording and/reproducing apparatus shown records and/or reproduces information onto and/or from a magneto-optical disc 31. The magneto-optical disc 31 includes, though not particularly shown, a substrate having a light transmitting property, a recording film made of a magneto-optical recording material which is formed on the substrate, and a protective film for protecting the recording film. The substrate of the magneto-optical disc 31 has a plurality of concentric or spiral pre-grooves and pre-pits representative of address information formed on one face thereof. The recording film is provided on the face of the substrate on which the pre-grooves are formed. A light beam emitted from an optical head 33, which will be hereinafter described, is scanned on the magneto-optical disc 31 along a pre-groove of the magneto-optical disc 31. The magneto-optical disc 31 is driven so as to rotate at a fixed angular velocity by a spindle motor 32. A turntable, not shown, is mounted at an end of a rotary shaft of the spindle motor 32. The magneto-optical disc 31 is removably mounted on the turntable. It is to be noted that, at a stage after manufacture but before shipment of the magneto-optical disc 31, an intense magnetic field is applied to the entire area of the magneto-optical disc 31 so as to effect bulk erase processing so as to arrange the magnetization direction of the recording film of the magneto-optical disc 31 in a fixed direction.

The optical head 33 is disposed in an opposing relationship to the substrate of the magneto-optical disc 31. The magnetic head 33 includes, similarly to the magnetic head shown in FIG. 1, a laser light source, an optical system, an objective lens, an actuator 33D serving as an actuator for fine adjustment, and a pair of photo-detectors 33A and 33B. The photo-detector 33A has a plurality of light receiving portions on a light receiving face thereof. Outputs of the light receiving portions are supplied to a detecting circuit 35, which will be hereinafter described, and a signal of a sum of the outputs of the light receiving portions is supplied to a differential amplifier 34. Though not specifically denoted by reference characters, the optical system includes a collimator lens for converting a light beam emitted from the laser light source into parallel light, a beam splitter for separating the parallel light and return light from the magneto-optical disc 31 from each other, a pair of lenses for forming images of the return light on the photo-detectors 33A and 33B, and a polarizing beam splitter 33C for separating the return light into a P-polarized light component and an S-polarized light component. The P-polarized light component and the S-polarized light component separated by the polarizing beam splitter 33C are received by the photo-detectors 33A and 33B, respectively. Output signals of the photo-detectors 33A and 33B are supplied to the differential amplifier 34. The differential amplifier 34 produces the difference between the output signals of the photo-detectors 33A and 33B. The difference signal indicative is a signal of the information recorded on and read from the magneto-optical disc 31. The detecting circuit 35 produces a focusing error signal and a tracking error signal based on a detection output of the photo-detector 33A. For example, a tracking error signal is formed by a push-pull method. The detecting circuit 35 further produces a signal of a sum of outputs of the light receiving portions of the photo-detector 33A. A servo circuit 36 receives the error signals produced by the detecting circuit 35 and produces a focusing servo signal and a tracking servo signal based on the error signals received from the detecting circuit 35. The focusing servo signal and the tracking servo signal are supplied to the actuator 33D. The actuator 33D drives the objective lens to move it in the focusing direction and the tracking direction based on the focusing servo signal and the tracking servo signal received. As a result, focusing and tracking of the light beam emitted from the optical head 33 toward the magneto-optical disc 31 are performed.

The signal of the sum of the detecting circuit 35 is supplied to a control data reproducing circuit 37. The control data reproducing circuit 37 forms a master clock signal $M_{ck}$ from the sum signal. The master clock signal $M_{ck}$ formed by the control data reproducing circuit 37 is supplied to a system control section 38. The system control section 38 communicates data to and from a controller 41, which will be hereinafter described, and controls operation of several components of the magneto-optical recording and/or reproducing apparatus including a recording data processing section 42 and the spindle motor 32. The difference signal from the differential amplifier 34 between the output signals of the photo-detectors 33A and 33B is supplied to a signal processing circuit 39. The difference signal is processed by demodulation processing, error correction processing and so forth by the signal processing circuit 39. The signal processing circuit 39 includes an AGC (Automatic Gain Control) circuit for restricting the amplitude of a signal to a fixed value. A data detecting section 40 performs sampling of recording data, for example, by code conversion or by differential calculus. The detecting section 40 further performs, simultaneously with such sampling of recording data, reproduction of a read clock signal $R_{ck}$. The recording data sampled by the data converting section 40 are supplied as reproduction data to the controller 41. The controller 41 is provided in the magneto-optical recording and/or reproducing apparatus and is connected to a host computer 44 which is outside the magneto-optical recording and/or reproducing apparatus. The controller 41 outputs the reproduction data to the host computer 44. The host computer 44 in turn supplies recording data and a control signal to the controller 41. The recording data from the controller 41 are supplied also to a recording data processing section 42. The recording data processing section 42 applies predetermined code modulating and blocking processing to the recording data, adds an error correction code to the recording data and supplies the resulting data as a driving signal to a magnetic head 43.

The magnetic head 43 is disposed in an opposing relationship to the optical head 33 with the magneto-optical disc 31 interposed therebetween. The magnetic head 32 applies a vertical magnetic field modulated in accordance with the driving signal supplied thereto to the recording film of the magneto-optical disc 31 from the protective film side of the magneto-optical disc 31.

Figure 1:
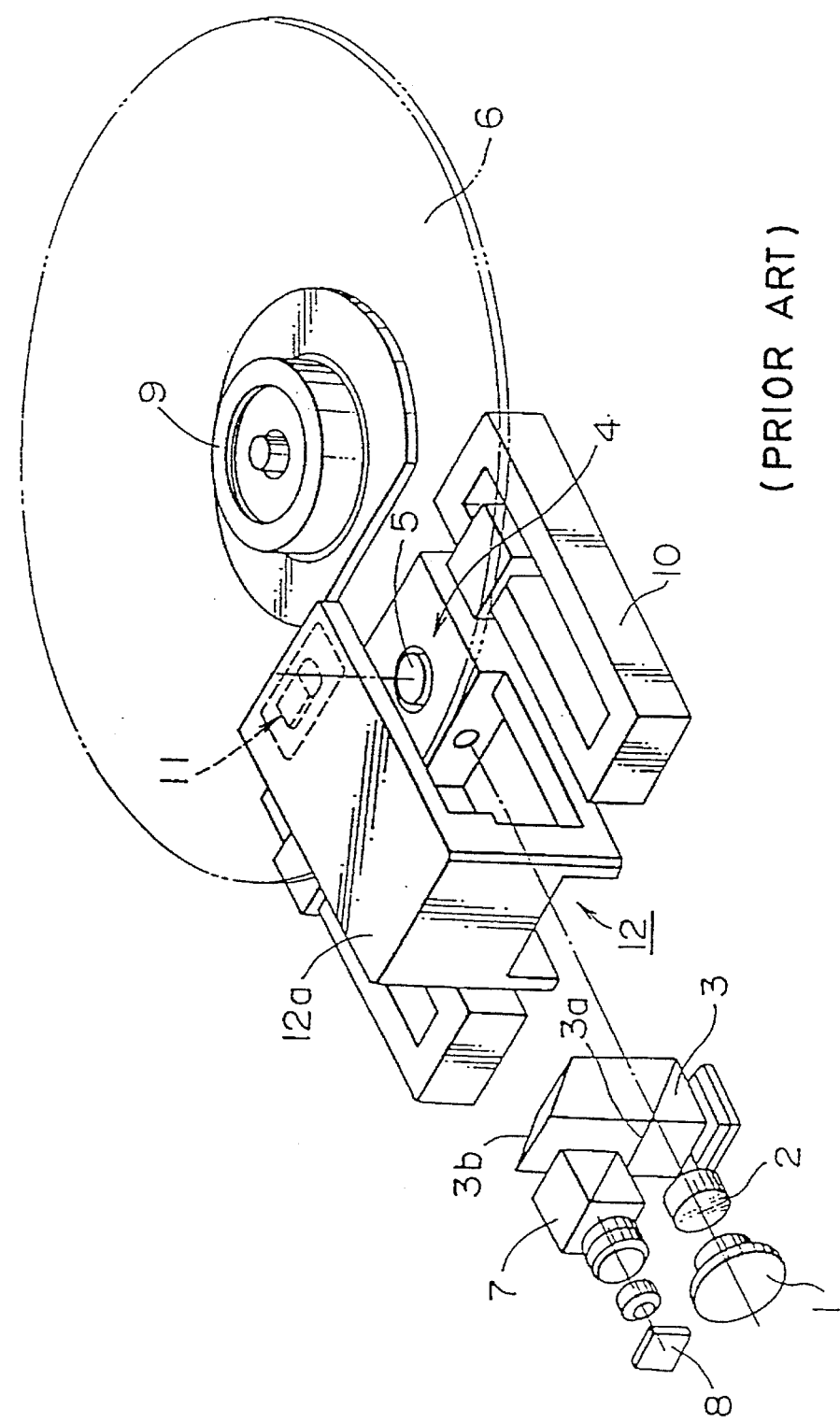
FIG. 1 is a perspective view of an exemplary one of conventional magneto-optical disc drive apparatus.

The optical head 33 and the magnetic head 43 are connected to each other by way of a connecting portion similar to the arrangement of FIG. 1. Further, similar to the arrangement shown in FIG. 1, the optical head 33 and the magnetic head 43 are driven in a radial direction of the magneto-optical disc 31 by a linear motor serving as an actuator for rough adjustment.

A temperature sensor 45 is disposed in the proximity of the magneto-optical disc 31. An output of the temperature sensor 45 is supplied to the system control section 38. The system control section 38 thus outputs the temperature data to the controller 41. The system control section 38 further controls operation of the laser light source of the optical head 33 based on the output of the temperature sensor 45 so as to adjust the intensity of the light beam which is to be emitted from the optical head 33.

The actuator 33D supports the objective lens for movement in the focusing direction and the tracking direction and includes a middle point sensor for detecting the amount of displacement of a movable portion of the magnetic head including the objective lens from a neutral point. A middle point sensor disclosed, for example, in Japanese Patent Laid-Open Application No. Heisei 3-84741 may be employed as the middle point sensor. An output signal of the middle point sensor is supplied to the system control section 38. The system control section 38 thus performs recording controlling operation which will be hereinafter described based on the output signal of the middle point sensor thus received.

Figure 2A:
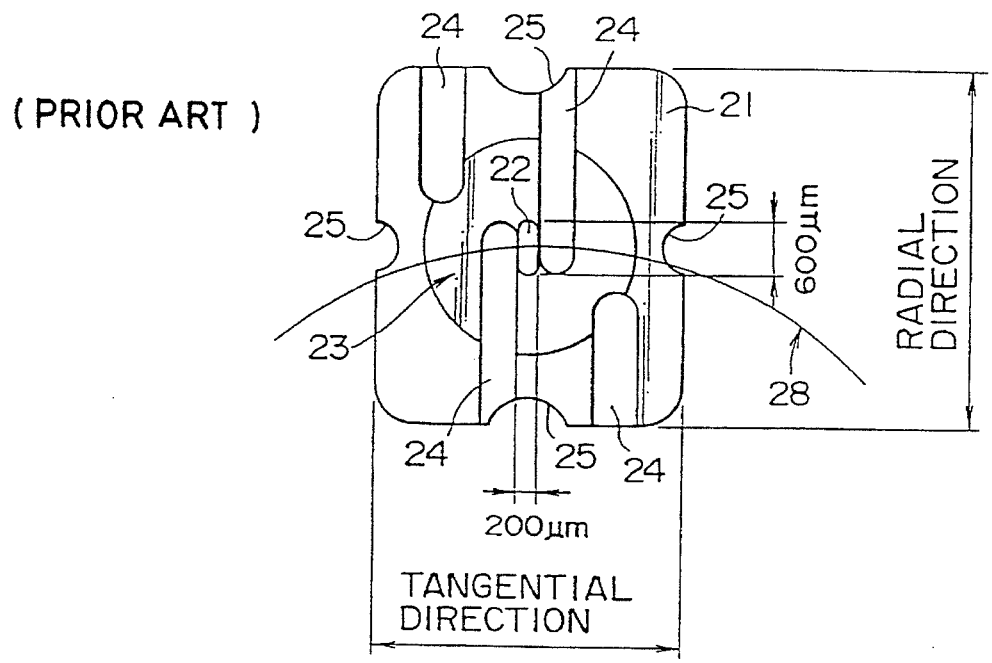
FIGS. 2A and 2B are a plan view and a side elevational view, respectively, of a core of a magnetic head of the magneto-optical disc drive apparatus of FIG. 1.
Figure 2B:
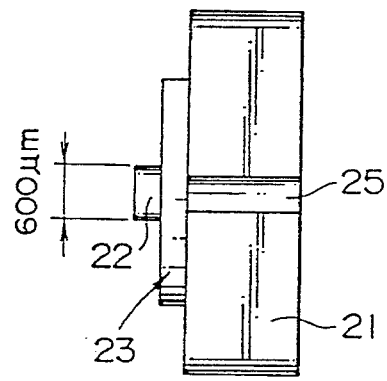
Figure 2C:
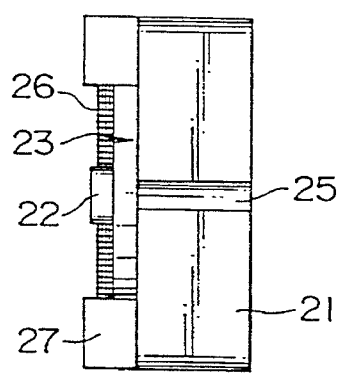
FIG. 2C is a side elevational view of the core of the magnetic head with a coil mounted thereon.
Figure 3:
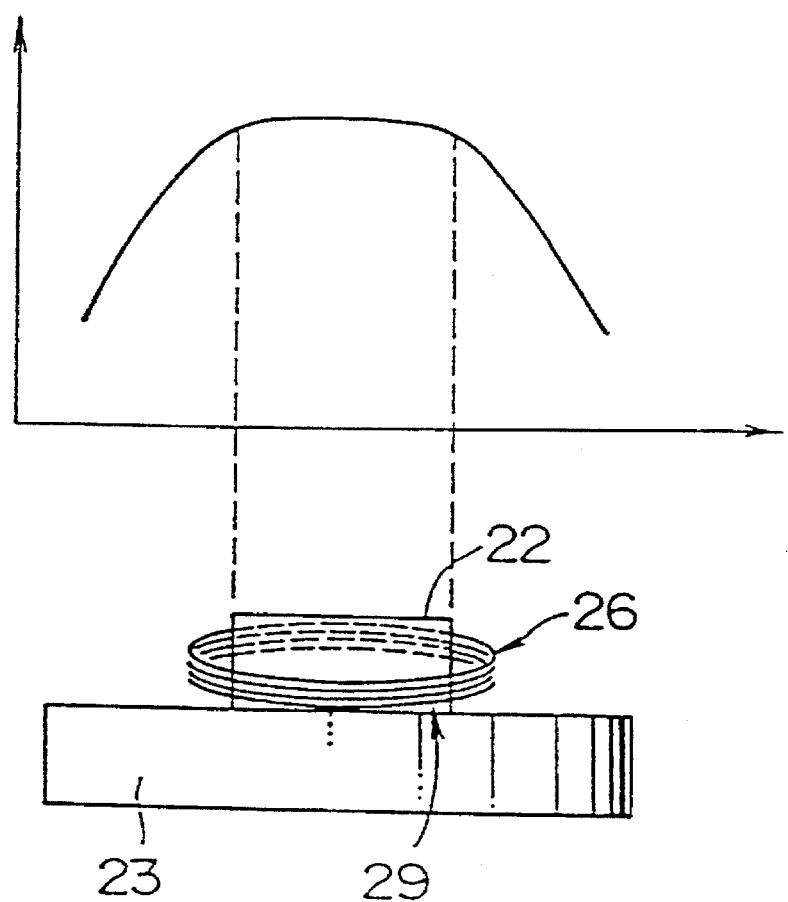
FIG. 3 is a diagrammatic view illustrating a characteristic of a magnetic field generated by the magnetic head shown in FIGS. 2A to 2C.
Figure 5:
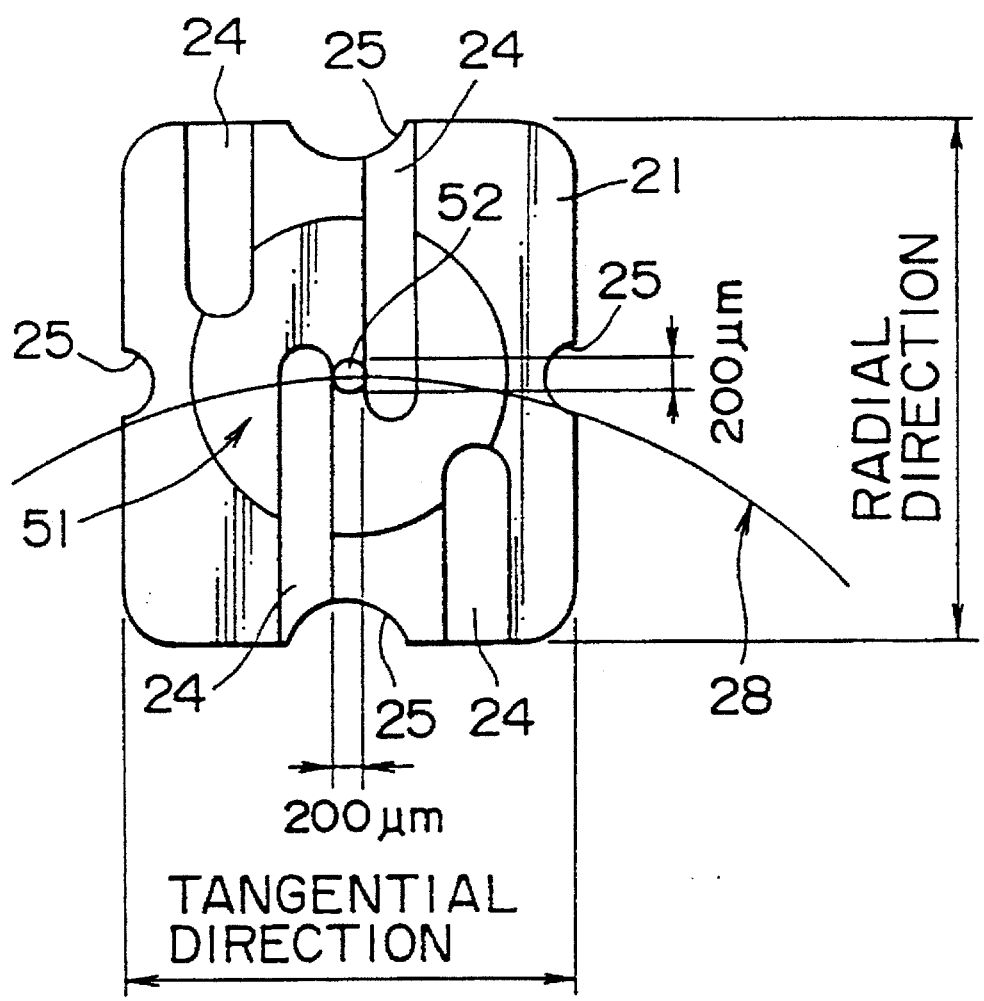
FIG. 5 is a plan view showing a core of a magnetic head of the magneto-optical disc drive apparatus of FIG. 4.

Referring now to FIG. 5, the magnetic head 43 includes a core 51 having a cylindrical protrusion 52 formed thereon. It is to be noted that, in FIG. 5, that the same or corresponding parts to those of FIG. 2 are denoted by the same reference numerals and detailed descriptions thereof are omitted. The protrusion 52 has, as seen from FIG. 5, a circular shape in plan view and has a dimension of 200 µm which extends in a radial direction of the magneto-optical disc 31 and also a dimension of 200 µm in a tangential direction of the magneto-optical disc 31. Thus, the dimension of the protrusion 52 in a radial direction of the magneto-optical disc 31 is reduced comparing with that of the magnetic head shown in FIG. 2. As a result, also the dimensions of a central magnetic pole of the magnetic head 32 and a portion of the protrusion 52, around which the coil is wound, in a radial direction of the magneto-optical disc 31 are decreased as compared with those of the magnetic head shown in FIG. 3.

The magneto-optical disc recording and/or reproducing apparatus shown in FIG. 4 performs a recording operation in the following manner. In particular, when a control signal representative of a recording instruction is supplied from the host computer 44 to the controller 41, the system control section 38 controls the spindle motor 2 to rotate the magneto-optical disc 31 at a fixed angular velocity. Simultaneously, the optical head 33 and the magnetic head 43 are fed in a radial direction of the magneto-optical disc 31 by the linear motor serving as an actuator for rough adjustment to a predetermined position which is a recording starting position, after which they thereafter enter a standby condition. Then, when a control signal representative of a recording starting instruction is subsequently supplied from the host computer 44 to the controller 41, the system controller section 38 sets the power of a light beam to be emitted from the optical head 33 to a recording power. Simultaneously, recording data are supplied from the host computer 44 by way of the controller 41 to the recording data processing section 42, in which predetermined signal processing is then. The thus processed recording data are supplied to the magnetic head 43. Consequently, a vertical magnetic field which is modulated based on the recording data is supplied from the magnetic head 43 to the magneto-optical disc 31 to effect recording of the recording data onto the magneto-optical disc 31. Thereupon, the temperature in the proximity of the magneto-optical disc 31 is measured by the temperature sensor 45. The intensity of the light beam to be emitted from the optical head 33 is controlled based on the output of the temperature sensor 45. Meanwhile, the light beam reflected by the magneto-optical disc 31 is received by the photo-detectors 33A and 33B. A focusing error signal and a tracking error signal are thus produced from the detecting circuit 35 based on output signals of the photo-detectors 33A and 33B and are supplied to the servo circuit 36. A focusing servo signal and a tracking servo signal are produced from the servo circuit 36 and supplied to the actuator 33D serving as an actuator for fine adjustment so that focusing servoing and tracking servoing are performed by the actuator 33D.

On the other hand, an operation of reproducing data recorded on the magneto-optical disc 31 is performed in the following manner. In particular, a control signal representative of a reproducing instruction is supplied from the host computer 44 to the controller 41. The controller 41 supplies an instruction signal based on the received control signal representative of a reproducing instruction to the system control section 38. The system control section 38 activates the spindle motor 2 based on the instruction signal so as to rotate the magneto-optical disc 31 at a fixed angular velocity. Further, the optical head 33 is fed by means of the linear motor to a reproduction starting position for the magneto-optical disc 31, at which time the optical head 33 enters a standby condition. Then, when a control signal representative of a reproduction starting instruction is supplied from the host computer 44 to the control 41, the system control section 38 produces a control signal to start a reproducing operation. Output signals from the photo-detectors 33A and 33B of the optical head 33 are supplied to the data detecting section 40 by way of the differential amplifier 34 and the signal processing circuit 49. The data detecting section 40 performs sampling of the received data in response to a master clock signal $M_{ck}$ received from the control data reproducing circuit 37. Reproduced data from the data detecting section 40 are outputted to the host computer 44 by way of the controller 41.

Figure 6:
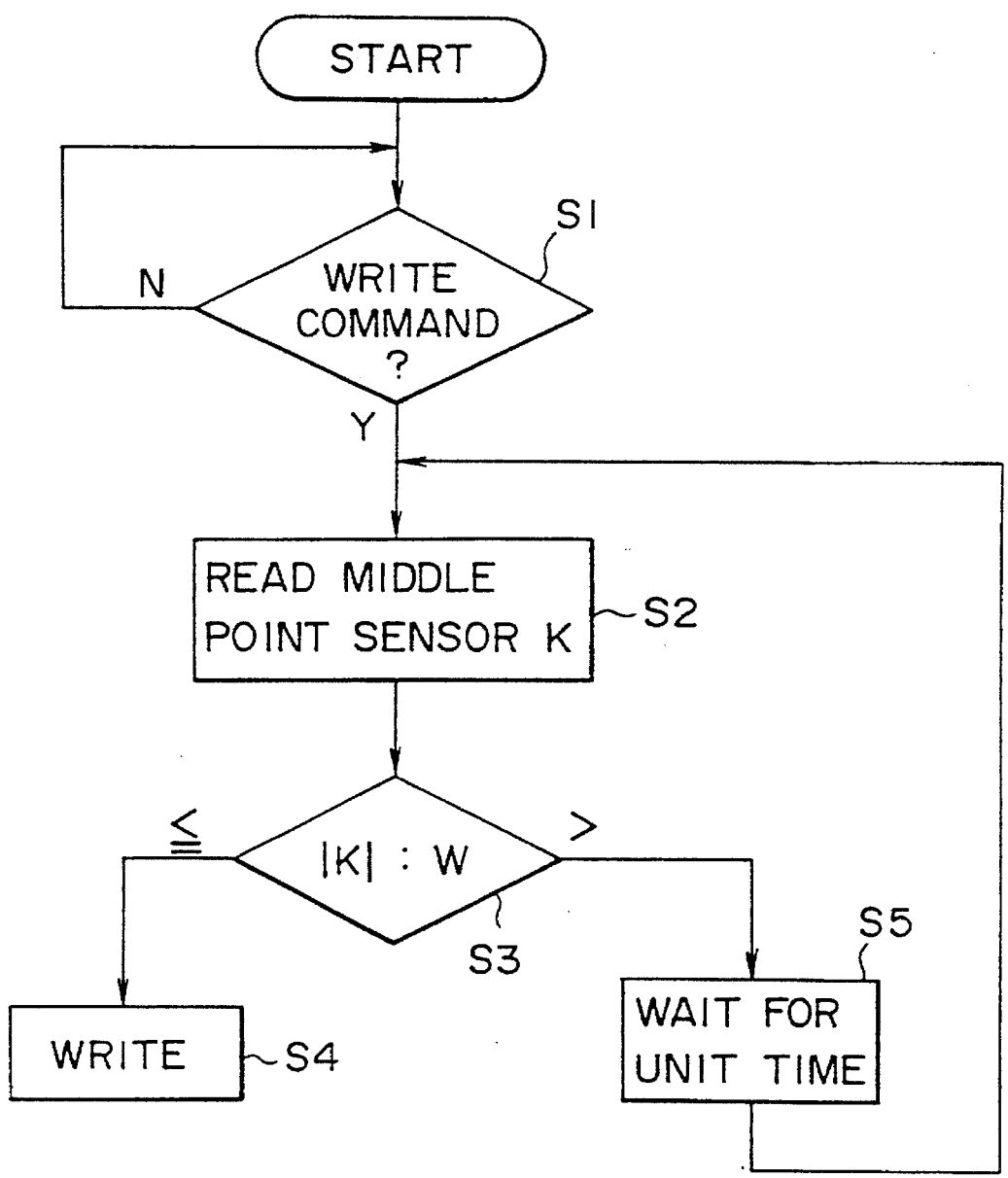
FIG. 6 is a flow chart illustrating operation of the magneto-optical disc drive apparatus of FIG. 4.

Subsequently, operation upon starting of recording will be described with reference to FIGS. 4 and 6. When the system control section 38 receives, from the controller 41, a recording starting instruction from the host computer 44, it reads an amount k of displacement of the movable portion of the actuator 33D of the optical head 33 from the neutral point from the middle point sensor provided in the optical head 33 (steps S1 and S2). If the displacement amount K is within a predetermined value W, then the system control section 38 starts a recording operation (S4), but if the displacement amount K exceeds the predetermined value W, the system control section 38 stands by for a unit time (step S5), and then it reads an amount K of displacement of the movable portion of the actuator 33D from the neutral point from the middle point sensor again (step S2). Then, the system control section 38 checks again to determine whether or not the displacement amount K is within the predetermined value W (step S3), and then if the displacement amount K still exceeds the predetermined value W, then the system control section 38 stands by for a unit time and then reads an amount K of displacement of the movable portion of the actuator 33D from the neutral point from the middle point sensor again, after which it checks again to determine whether or not the displacement amount K thus read is within the predetermined value W (steps S5, S2 and S3). The predetermined value W here is a value corresponding to the range or width of the magnetic field which is supplied from the magnetic head 43 and has an intensity sufficient to allow recording of information onto a magneto-optical disc.

In this manner, a similar operation is repeated until the amount K of displacement of the movable portion of the actuator 33D from the neutral point comes into the range of the predetermined value W (repetition of steps S5, S2 and S3). Then, after the amount K of displacement of the movable portion of the actuator 33D from the neutral point comes into the range of the predetermined value W, the system control section 38 starts recording of data onto the magneto-optical disc 31 (steps S3 and S4).

Starting of recording of data by the system control section 38 is performed in the following manner. In particular, when the system control section 38 determines at step S3 that the displacement amount K based on the output of the middle point sensor is within the predetermined value W, it outputs an instruction output to the controller 41. In response to the instruction output of the system control section 38, the controller 41 outputs recording data to the recording data processing section 42. The recording data processing section 42 outputs the recording data to the magnetic head 43 in response to a timing control signal. The magnetic head 43 applies a modulating magnetic field based on the recording data to a portion of the recording film of the magneto-optical disc 31 upon which a spot of a beam from the optical head 33 is irradiated to effect recording onto the magneto-optical disc 31 (step S4).

Subsequently, a second embodiment of a recording starting method in a magneto-optical disc recording and/or reproducing apparatus will be described with reference to FIGS. 4 and 5 and also to FIG. 7 which illustrates the second recording staring method in a modified magneto-optical disc recording and/or reproducing apparatus. It is to be noted that, in this instance, the magneto-optical disc recording and/or reproducing apparatus to which the present recording starting method is applied is a modification to and different from the magneto-optical disc recording and/or reproducing apparatus only in that the optical head 33 of the magneto-optical disc recording and/or reproducing apparatus in FIG. 4 does not include the middle sensor described above.

Figure 7:
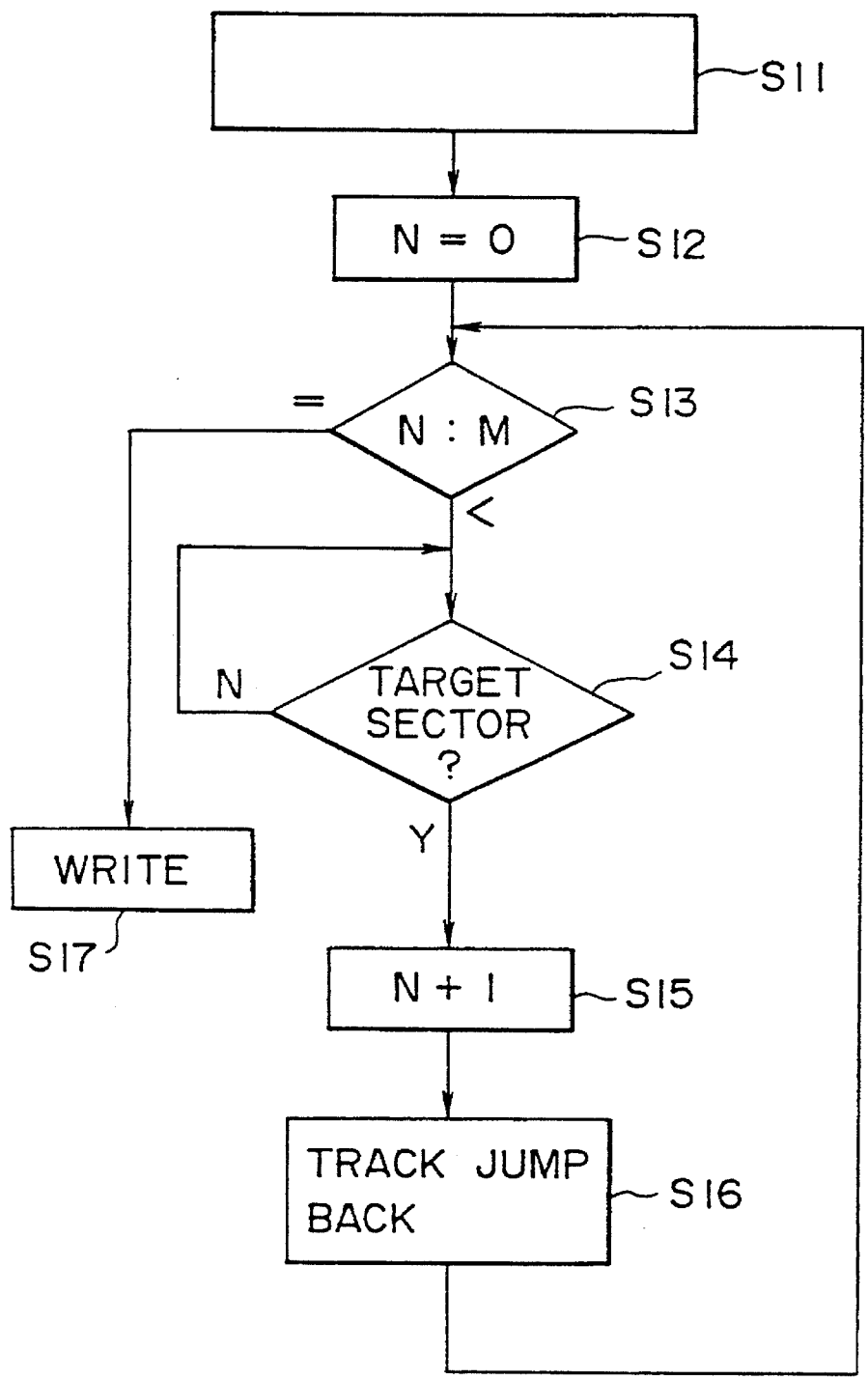
FIG. 7 is a similar view but illustrating operation of a modified magneto-optical disc drive apparatus.

Referring particularly to FIGS. 4 and 7, when the controller 41 receives a seeking and recording instruction from the host computer 44, it delivers the instruction to the system control section 38 (step S11). In accordance with the instruction from the controller 41, the system control section 38 drives the linear motor serving as an actuator for rough adjustment to move the optical head 33 and the magnetic head 43 to seek a target track of the magneto-optical disc 31. After the target track is reached, the optical head 33 and the magnetic head 43 enter into a still condition and hence into a recording standby condition. The system control section 38 then resets the count value N of a counter in the system control section 38 to zero ("0") (step S12). Then, the system control section 38 compares the count value N with a preset value M (step S13), and if the result of the comparison reveals that the preset value M is higher than the count value N, each time a target sector of the target track is passed, the count value N is incremented by one ("1") (steps S14 and S15). Then, the system control section 38 causes the optical head 33 and the magnetic head 43 to perform track jumping back by one track distance.

Then, the system control section 38 compares the count value N with the preset value M again (step S13), and then, if the count value N is lower than the preset value M, then when the target sector of the target track is reached, the count value N is incremented by 1 and track jumping back is performed (steps S14, S15 and S16).

Then, the system control section 38 checks again to determine whether or not the count value N becomes equal to the preset value M (step S13), and if the count value N is lower than the preset value M, then a similar operation is repeated until the count value N becomes equal to the preset value M (steps S13 to S16). Then, after the count value N becomes equal to the preset value M, the system control section 38 delivers its output to the controller 41 to start a writing operation (steps S13 and S17).

In this manner, the system control section 38 starts a recording operation after a predetermined time elapses after seeking, that is, after the count value N becomes equal to the preset value M.

In short, even if the linear motor serving as an actuator for rough adjustment is stopped when the target track is reached as a result of seeking, the actuator 33D of the optical head 33 will be displaced from the neutral point by the inertia thereof. Further, since the tracking servo is in an inoperative condition during seeking, the movable portion of the actuator 33D is in a free condition, and upon the ending of seeking, the movable portion of the actuator 33D is in a condition wherein it does not stop but oscillates in a radial direction of the magneto-optical disc 31 by a significant distance. In this instance, even if a magnetic field is applied from the magnetic head 43, the movable portion of the actuator 33D, or in other words, the objective lens, may not always be within the range with a magnetic field of an intensity sufficient to allow recording and may not always achieve correct recording. Therefore, in the magneto-optical disc recording and/or reproducing apparatus, a certain interval of time is set after seeking, and recording is not started until after oscillations of the movable portion of the actuator 33D are reduced until they are small.

The preset value M described above is a value corresponding to a period of time required until the movable section of the actuator 33D comes, after ending of seeking, to a position within a magnetic field which is applied from the magnetic head 43 and is sufficient to allow recording.

It is to be noted that, in the modified magneto-optical disc recording and/or reproducing apparatus described above, the predetermined time after searching is set to the number K of times for which passage of a target sector of a target track has been awaited and the predetermined time is measured by detecting that the count value N actually becomes equal to M.

In this instance, the number M of times for which passage of the target sector of the target track is awaited need not be fixed corresponding to the predetermined time after searching described above, and may be varied, for example, in response to a searching distance.

Subsequently, after the predetermined time passes after searching, the actuator 33D is either at the position of the neutral point or in a finely oscillating condition around the neutral point as can be recognized from the foregoing description. The controller 41 outputs recording data to the recording data processing section 42 in response to an instruction output from the system controller 38. The recording data processing section 42 outputs the recording data to the magnetic head 43 in response to a timing control signal of the system control section 38. The magnetic head 43 applies a modulating magnetic field in accordance with the recording data to a portion of the recording film of the magneto-optical disc 31 upon which a spot of a beam from the optical head 33 is irradiated to effect recording on the magneto-optical disc 31.

In the modified magneto-optical disc recording and/or reproducing apparatus of the construction described above, whenever recording is to be started, the actuator 33D is either at the neutral position or in the proximity of the neutral point, and accordingly, the position of a spot of a beam irradiated upon the magneto-optical disc 31 is at the neutral point (center). Consequently, the dimension of the central magnetic pole of the magnetic head 43 also in a radial direction of the magneto-optical disc 31 is only required to correspond to the mounting error equal to that in a tangential direction of the magneto-optical disc 31, for example, ±50 µm. Accordingly, the dimension of the central magnetic pole in a radial direction of the magneto-optical disc 31 can be reduced comparing with that in the conventional magneto-optical disc recording and/or reproducing apparatus, as seen from FIG. 5. It is to be noted that FIG. 5 shows the core of the magnetic head with the coil removed.

Consequently, the wire material of the coil of the magnetic head is reduced in length, which results in reduction of the inductance of the coil. Consequently, the magnetic head 43 can be driven with a higher frequency, which can cope with an increase in density and velocity of the magneto-optical disc 31.

It is to be noted that the present invention is not limited to the embodiments described above and many changes and modifications can be made thereto without departing from the spirit and scope of the invention. For example, while the system control section 38 is employed in the embodiments described above, it may otherwise be incorporated in the controller 41 so that the controller 41 may operate similarly to the system control section 38. Further, while the system control section 38 in the first embodiment described above executes the operation of the flow chart shown in FIG. 6, the present invention is not limited to this and alternatively the controller 41 may execute the operation of the flow chart shown in FIG. 6.

What is claimed is:

1. A magneto-optical disc recording apparatus including a magneto-optical disc formed with target tracks, comprising:

a magnetic head for applying to a magneto-optical disc a vertical magnetic field modulated in accordance with data to be recorded onto the magneto-optical disc which has target tracks;

an optical head which is fed in a radial direction of the magneto-optical disc and is mounted together with said magnetic head and for irradiating a light beam upon the magneto-optical disc from the side of a substrate of the magneto-optical disc;

a position detector providing an error signal and detecting the position of a movable portion of said optical head in the radial direction of the magneto-optical disc so as to determine the radial position of said magnetic head and said optical head relative to said target tracks and producing an error signal proportional to the radial deviation from said target tracks;

a controller for controlling said magnetic head and said optical head so as to start recording by said optical head and said magnetic head when said error signal is less than a predetermined amount;

wherein said position detector is provided on said optical head; and wherein said optical head includes a pair of actuators for moving an objective lens in a focusing direction and a tracking direction, and further includes a moving device for moving said optical head in a radial direction of the magneto-optical disc.

2. A magneto-optical disc recording apparatus, comprising:

a magnetic head for applying to a magneto-optical disc a vertical magnetic field modulated in accordance with data to be recorded onto the magneto-optical disc which has target tracks;

an optical head which is fed in a radial direction of the magneto-optical disc together with said magnetic head and which irradiates a light beam upon the magneto-optical disc from the side of a substrate of the magneto-optical disc;

feeding means for feeding said optical head and said magnetic head in a radial direction of the magneto-optical disc;

a controller for controlling said magnetic head and said optical head and which stands by for a predetermined time after said optical head and said magnetic head are moved to a position within a predetermined distance of a target track of said magneto-optical disc by said feeding means and which then records with said optical head and said magnetic head on said magneto-optical disc; and wherein said controller includes time setting means for setting an interval of time during which a movable portion of said optical head comes to a position within a magnetic field which has an intensity so that said magnetic head can record.

* * * * *